(12) United States Patent
Liang

(10) Patent No.: US 9,734,175 B2
(45) Date of Patent: Aug. 15, 2017

(54) METHODS FOR ACCESSING DATA IN CLOUD STORAGE SPACE AND APPARATUSES USING THE SAME

(71) Applicant: Wistron Corp., New Taipei (TW)

(72) Inventor: Wei-Kuo Liang, New Taipei (TW)

(73) Assignee: Wistron Corp., New Taipei (TW)

( * ) Notice: Subject to any disclaimer, the term of this patent is extended or adjusted under 35 U.S.C. 154(b) by 243 days.

(21) Appl. No.: 14/518,911

(22) Filed: Oct. 20, 2014

(65) Prior Publication Data

US 2016/0063041 A1 Mar. 3, 2016

(30) Foreign Application Priority Data

Sep. 2, 2014 (TW) .............................. 103130201 A (51) Int. Cl.
*G06F 17/30* (2006.01)
*H04L 29/08* (2006.01)

(52) U.S. Cl.
CPC ........ *G06F 17/30312* (2013.01); *H04L 67/10* (2013.01); *H04L 67/1085* (2013.01); *H04L 67/1097* (2013.01)

(58) Field of Classification Search
CPC ..................... G06F 17/30091; G06F 17/30159
See application file for complete search history.

(56) References Cited

U.S. PATENT DOCUMENTS

| | | | | |
|---|---|---|---|---|
| 6,922,781 | B1* | 7/2005 | Shuster | G06F 21/564 713/165 |
| 7,908,302 | B1* | 3/2011 | Nagaralu | G06F 17/30067 707/821 |
| 8,234,372 | B2* | 7/2012 | Knapp | G06F 17/30067 709/202 |
| 8,719,223 | B2* | 5/2014 | Knapp | G06F 17/302 707/626 |
| 9,418,072 | B2* | 8/2016 | Calkowski | G06F 17/30174 |
| 2007/0260609 | A1* | 11/2007 | Tulyani | H04L 67/1097 |
| 2014/0007250 | A1 | 1/2014 | Stefanov et al. | |
| 2014/0052706 | A1* | 2/2014 | Misra | G06F 17/30073 707/698 |
| 2015/0186668 | A1* | 7/2015 | Whaley | G06F 21/6218 713/156 |
| 2015/0381736 | A1* | 12/2015 | Seltzer | H04L 67/1097 709/203 |
| 2016/0065547 | A1* | 3/2016 | Heinrich | G06F 17/30091 713/171 |
| 2016/0072889 | A1* | 3/2016 | Jung | H04L 67/1097 709/219 |
| 2016/0224548 | A1* | 8/2016 | Massand | G06F 17/30392 |
| 2017/0013045 | A1* | 1/2017 | Predmore, II | H04L 67/06 |

FOREIGN PATENT DOCUMENTS

| | | |
|---|---|---|
| TW | 201317823 A1 | 5/2013 |
| TW | 201339884 A | 10/2013 |

\* cited by examiner

*Primary Examiner* — Debbie Le (57) ABSTRACT

An embodiment of the invention introduces a method for accessing data in cloud storage space, which contains at least the following steps. A file is obtained. File uploads are generated, where each file upload contains partial data of the file. The file uploads are stored in storage servers of the cloud storage space, where the storage servers are governed by different cloud storage providers.

20 Claims, 7 Drawing Sheets

METHODS FOR ACCESSING DATA IN CLOUD STORAGE SPACE AND APPARATUSES USING THE SAME

CROSS REFERENCE TO RELATED APPLICATIONS

This application claims priority of Taiwan Patent Application No. 103130201, filed on Sep. 2, 2014, the entirety of which is incorporated by reference herein.

BACKGROUND

Technical Field

The present invention relates to data storage, and in particular, to methods for accessing data in cloud storage space and apparatuses using the same.

Description of the Related Art

Cloud storage is a model of data storage where the digital data is stored in logical pools. The physical storage spans across multiple servers (and often locations) and the physical environment is typically owned and managed by a hosting company. These cloud storage providers are responsible for keeping the data available and accessible, and the physical environment protected and running. However, users are typically concerned about the data security of the cloud storage. For example, data is intercepted when being passed over a digital network to the cloud storage space, data of the storage space is lost when the physical storage system crashes, or is stolen when the cloud storage providers cannot provide rigid protection. Thus, it is desirable to have methods for accessing data in cloud storage space and apparatuses using the same to improve data security.

BRIEF SUMMARY

An embodiment of the invention introduces a method for accessing data in cloud storage space, which contains at least the following steps. A file is obtained. File uploads are generated, where each file upload contains partial data of the file. The file uploads are stored in storage servers of the cloud storage space, where the storage servers are governed by different cloud storage providers.

An embodiment of the invention introduces an apparatus for accessing data in cloud storage space, which contains at least a communications interface and a processing unit. The processing unit, coupled to the communications interface, obtains a first file; generates file uploads, where each file upload contains partial data of the first file. The processing unit further stores the file uploads in storage servers of the cloud storage space via the communications interface, where the storage servers are governed by different cloud storage providers A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It should be understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
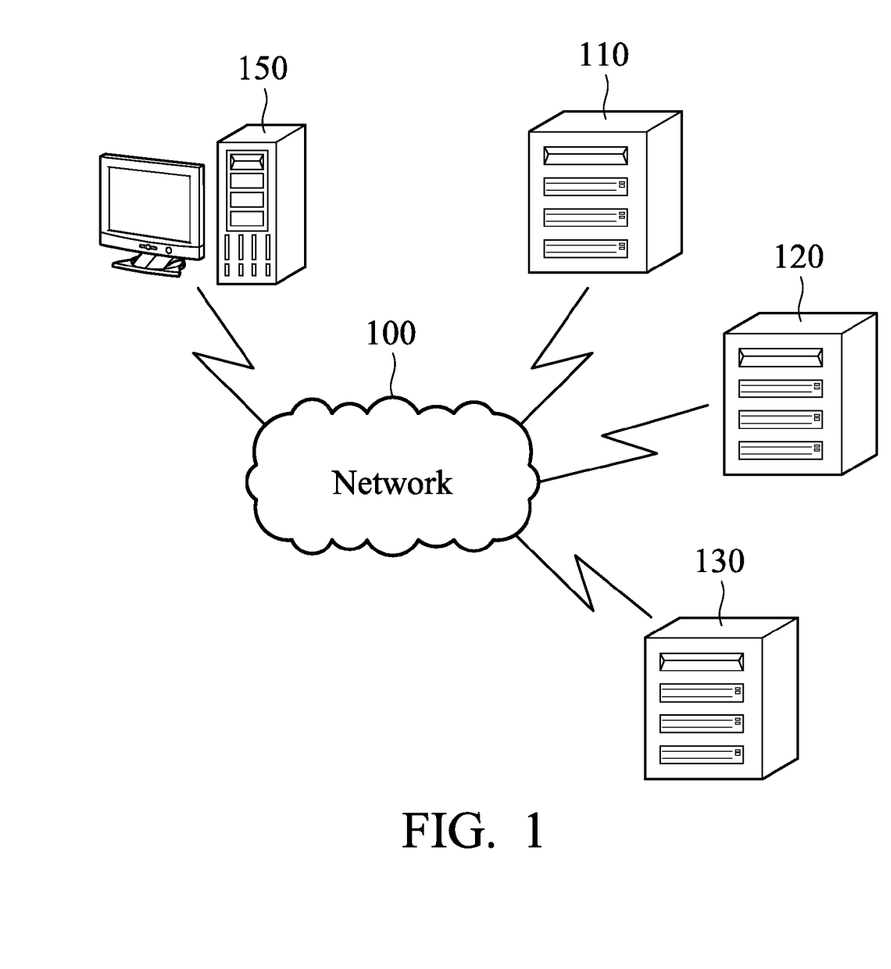
FIG. 1 is a schematic diagram of the network architecture according to an embodiment of the invention.

An embodiment of the invention introduces network architecture containing multiple storage servers owned by different cloud storage providers, and a client capable of distributing data to the storage servers. FIG. 1 is a schematic diagram of the network architecture according to an embodiment of the invention. Three different cloud storage providers respectively own storage servers 110 to 130, such as a Google Drive server, a Dropbox server, a SugarSync server, etc. A desktop computer 150 (also referred to as a client) may store data in the storage servers 110 to 130 and retrieve data from the storage servers 110 to 130 via a network 100. The network 100 may be the Internet, a wired LAN (Local Area Network), a WLAN (wireless LAN) or any combination thereof. It should be noted that the desktop computer 150 needs to pass the security verification before accessing any of the storage servers 110 to 130. Specifically, the desktop computer 150 needs to provide a set of an ID (Identity) and a password to the storage server and starts to access the storage server after the ID and the password have been authenticated. Although the desktop computer 150 is shown in the embodiment, it should be understood that alternative embodiments are contemplated to install a client in an electronic apparatus capable of communicating with the storage servers, such as a mobile phone, a tablet computer, a notebook, etc.

Figure 2:
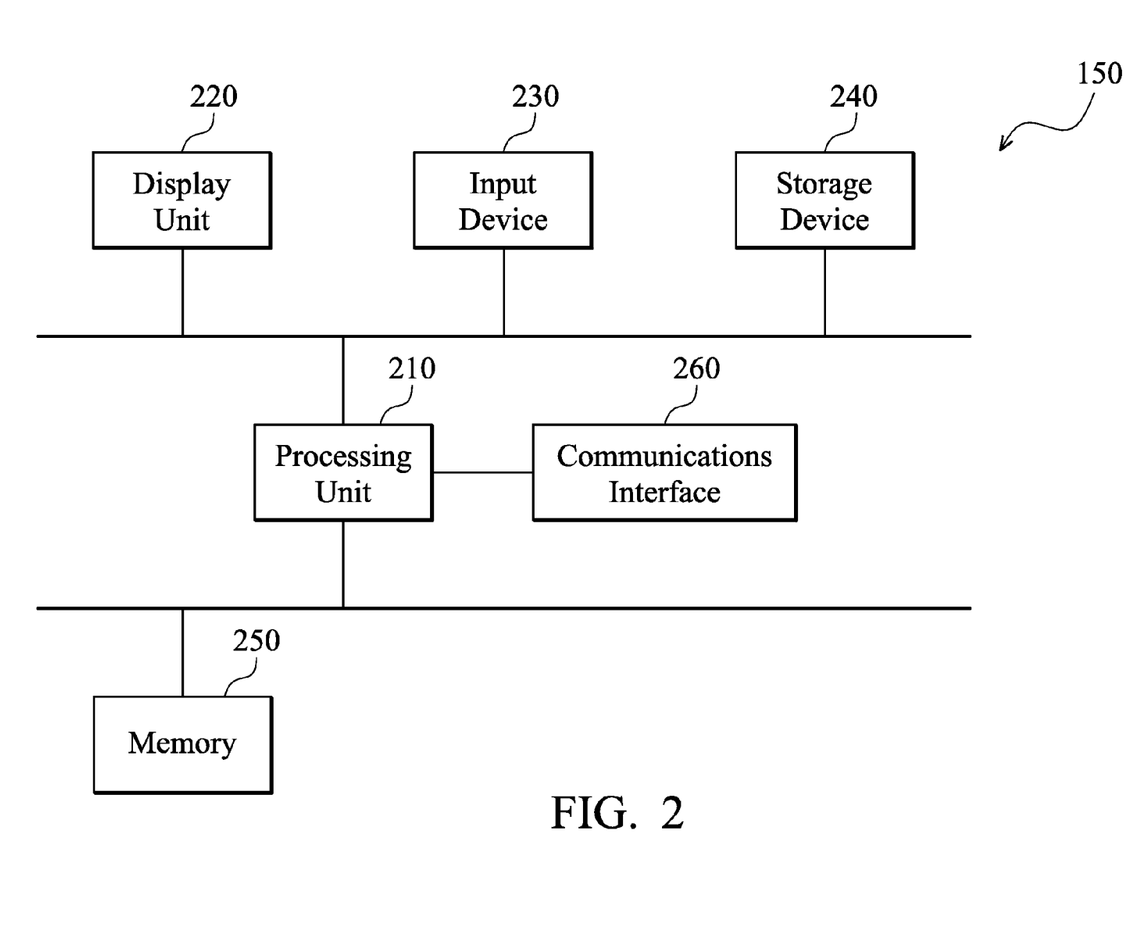
FIG. 2 is the system architecture of a computer apparatus according to an embodiment of the invention.

FIG. 2 is the system architecture of a computer apparatus according to an embodiment of the invention. The system architecture may be practiced in the desktop computer 150, at least including a processing unit 210. The processing unit 210 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The system architecture further includes a memory 250 for storing necessary data in execution, such as variables, data tables, or others, and a storage unit 240 for storing a wide range of electronic files, such as Web pages, documents, video files, audio files, or others. A communications interface 260 is included in the system architecture and the processing unit 210 can thereby communicate with storage servers 110, 120, 130, or other electronic devices. The communications interface 260 may be a wireless telecommunications module, a LAN (Local Area Network) communications module, a WLAN (Wireless Local Area Network), or any combination thereof. The wireless telecommunications module may have modems supporting arbitrary combinations of the 2G, 3G, 4G and the higher-generation technology. The system architecture further includes one or more input devices 230 to receive user input, such as a keyboard, a mouse, a touch panel, or others. A user may press hard keys on the keyboard to input characters, control a mouse pointer on a display by operating the mouse, or control an executed application with one or more gestures made on the touch panel. The gestures include, but are not limited to, a single-click, a double-click, a single-finger drag, and a multiple finger drag. A display unit 220, such as a TFT-LCD (Thin film transistor liquid-crystal display) panel, an OLED (Organic Light-Emitting Diode) panel, or others, may also be included to display input letters, alphanumeric characters and symbols, dragged paths, drawings, or screens provided by an application for a user's viewing.

Figure 3:
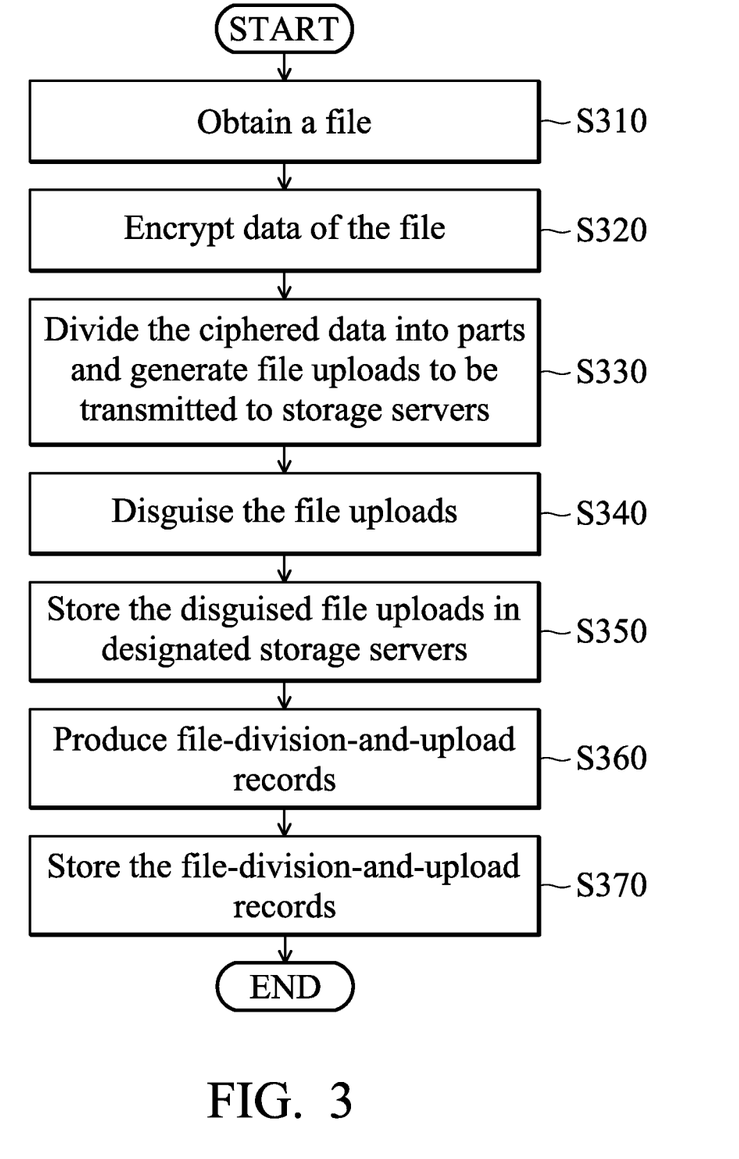
FIG. 3 is a flowchart illustrating a method for storing data in a storage server of cloud storage space according to an embodiment of the invention.
Figure 4:
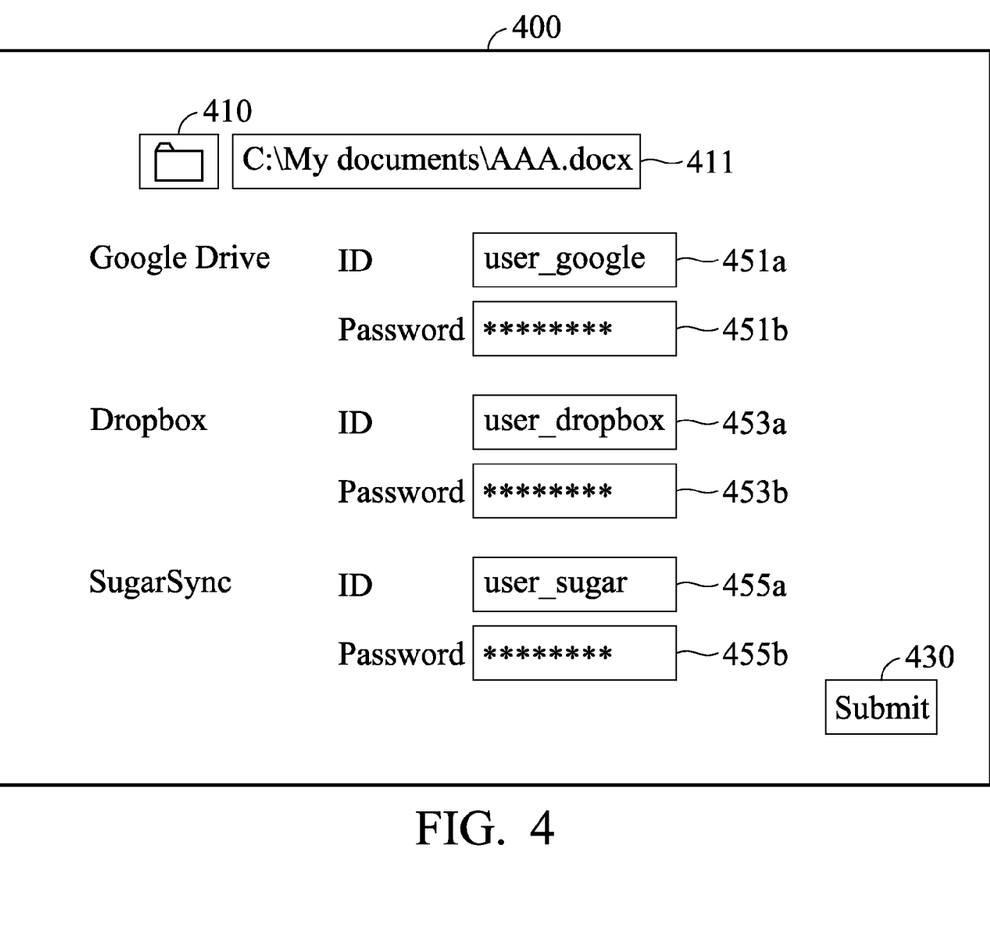
FIG. 4 is a schematic diagram showing a file upload screen according to an embodiment of the invention.

FIG. 3 is a flowchart illustrating a method for storing data in a storage server of cloud storage space according to an embodiment of the invention. The method is performed when the processing unit 210 of the desktop computer 150 loads and executes relevant software instructions. In order to improve the security of files stored in the cloud storage space, the processing unit 210 divides a file into several parts and respectively stores the divided parts in several storage servers 110 to 130, which are governed by different cloud storage providers, via the communications interface 260. The process begins to obtain a file (step S310). The file may contain word processing data, a digital spreadsheet, a digital presentation, image data, audio data, video data, etc. In step S310, the processing unit 210 may provide a MMI (Man-Machine Interface) to help a user to select a file to be uploaded and fill several sets of login accounts (also referred to as IDs) and passwords for designated storage servers. FIG. 4 is a schematic diagram showing a file upload screen according to an embodiment of the invention. The MMI includes a file upload screen 400. After a file selection button 410 is pressed, the processing unit 210 introduces a window manager of a UI (User Interface) control to help the user to select a file to be uploaded from the storage device 240 and shows a selection result in a file path field 411. The file upload screen 400 further contains six input boxes 451a to 455b to facilitate the input of three sets of login accounts and passwords. For example, the input boxes 451a and 451b help the user to fill the ID and the password for logging on to the Google Drive server. The input boxes 453a and 453b help the user to fill the ID and the password for logging on to the Dropbox server. The input boxes 455a and 455b help the user to fill the ID and the password for logging on to the SugarSync server. After a submit button 430 is pressed, the processing unit 210 may store the three sets of IDs and passwords in the memory 250. Although three storage servers are shown in the embodiment, it should be understood that alternative embodiments are contemplated to divide a single file into two or more than three parts and store the divided ones in the equal number of storage servers.

Figure 5:
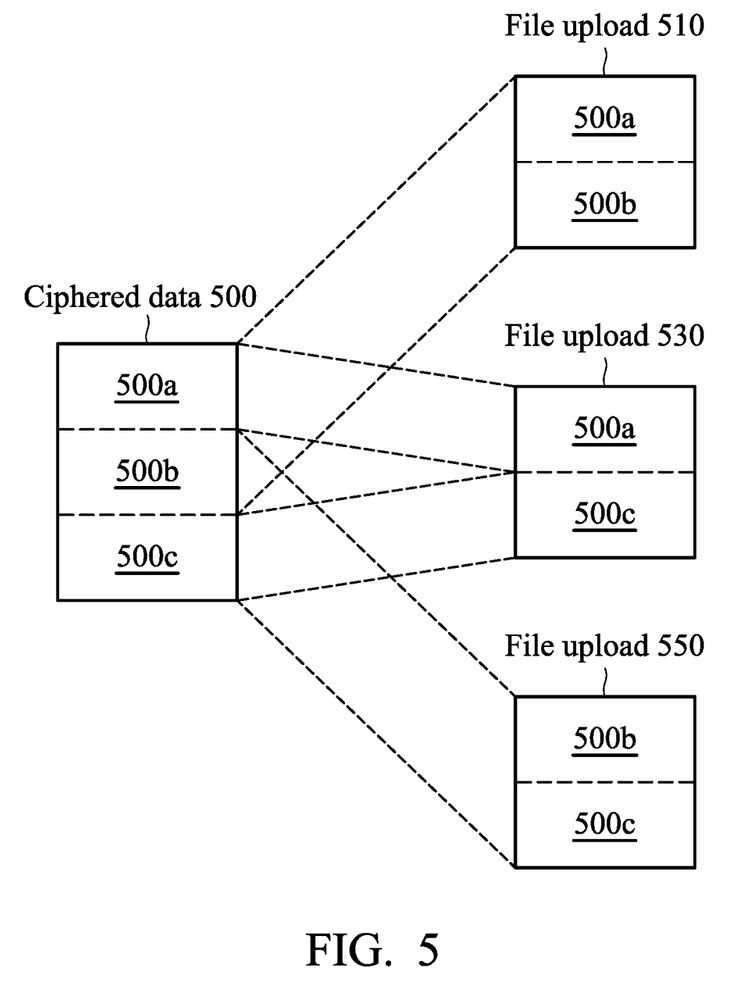
FIG. 5 is a schematic diagram depicting file divisions and assemblies for file uploads according to an embodiment of the invention.
Figure 6:
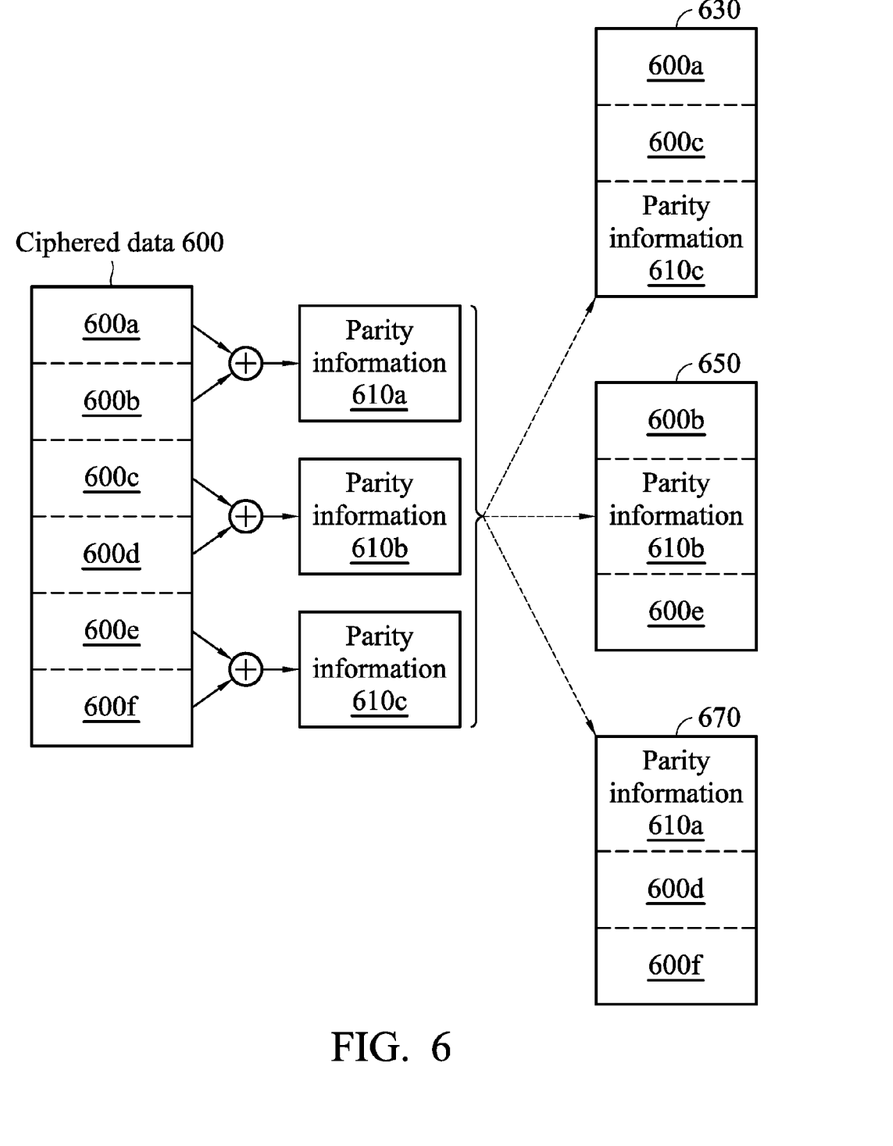
FIG. 6 is a schematic diagram depicting file divisions and assemblies for file uploads according to an embodiment of the invention.

The processing unit 210 then encrypts data of the file (step S320). In step S320, the processing unit may employ DES (Data Encryption Standard), AES (Advanced Encryption Standard), or other algorithms to perform the encryption. DES is an algorithm that takes a fixed-length string of plaintext bits and transforms it through a series of complicated operations into another ciphertext bitstring of the same length. In the case of DES, the block size is 64 bits. DES uses a key to customize the transformation, so that decryption can supposedly only be performed by those who know the particular key used to encrypt. AES is based on a design principle known as a substitution-permutation network, combination of both substitution and permutation. Unlike its predecessor DES, AES does not use a Feistel network. AES is a variant of Rijndael which has a fixed block size of 128 bits, and a key size of 128, 192, or 256 bits. Conversely, the Rijndael specification per se is specified with block and key sizes that may be any multiple of 32 bits, both with a minimum of 128 and a maximum of 256 bits. In alternative embodiments, the processing unit 210 may omit the step S320 to perform subsequent steps with plaintext of the file, and the invention should not be limited thereto. Next, the processing unit 210 divides the ciphered data into parts, in which the total number of divided parts may equal the total number of storage servers storing the divided parts, and generates file uploads to be transmitted to the storage servers 110 to 130, each of which is formed by assembling several parts (step S330). In an example, the processing unit 210 divides the ciphered data into three parts and, for each storage server, assembles two of them into a file upload, where only the half content of one file upload is the same as that of another file upload. FIG. 5 is a schematic diagram depicting file divisions and assemblies for file uploads according to an embodiment of the invention. The processing unit 210 divides the ciphered data 500 into three parts 500a to 500c, assembles two parts 500a and 500b to form a file upload 510 to be stored in the storage server 110, assembles two parts 500a and 500c to form a file upload 530 to be stored in the storage server 120, and assembles two parts 500b and 500c to form a file upload 550 to be stored in the storage server 130. The three file uploads 510, 530 and 550 may be named "AAA_001.docx", "AAA_002.docx" and "AAA_003.docx" respectively. In another example, the processing unit 210 divides the ciphered data into six parts, calculates parity information for each two parts and, for each storage server, assembles two parts and one piece of parity information to form a file upload, in which the two parts and one piece of parity information have no dependency. The file uploads formed by the aforementioned operations are similar to RAID-5 (Redundant Array of Independent Disks 5). FIG. 6 is a schematic diagram depicting file divisions and assemblies for file uploads according to an embodiment of the invention. The processing unit 210 divides the ciphered data 600 into six parts 600a to 600f and calculates parity information 610a according to the parts 600a and 600b, parity information 610b according to the parts 600c and 600d and parity information 610c according to the parts 600e and 600f. Next, the processing unit 210 assembles the parts 600a and 600c and the parity information 610c to form a file upload 630 to be stored in the storage server 110, the parts 600b and 600e and the parity information 610b to form a file upload 650 to be stored in the storage server 120, and the parity information 610a and the parts 600d and 600f to form a file upload 670 to be stored in the storage server 130. The three file uploads 630, 650 and 670 may be named "AAA_001.docx", "AAA_002.docx" and "AAA_003.docx" respectively. Those skilled in the art understand that, when a system crash happens in one of the storage servers 110 to 130, the processing unit 210 can recover the whole ciphered data according to the partial data stored in the other two storage servers, thus, the fault-tolerant ability is increased.

The processing unit 210 disguises the file uploads to modify their original file types with other file types (step S340). For example, the three word-processing file uploads (.docx) can pretend to be image file uploads (.jpg) named "AAA_001.jpg", "AAA_002.jpg" and "AAA_003.jpg" respectively. In step S340, the processing unit 210 may employ a file binding method to combine the file uploads into image files. In alternative embodiments, the processing unit 210 may omit step S340 to perform subsequent steps with the original file uploads (i.e. the undisguised ones) generated in step S330. The processing unit 210 stores the disguised file uploads in designated storage servers via the communications interface 260 (step S350). For example, the disguised file uploads "AAA_001.jpg", "AAA_002.jpg" and "AAA_003.jpg" are stored in the storage servers 110 to 130 respectively. It should be noted that, before the file uploads, the processing unit 210 needs to obtain the necessary sets of login accounts and passwords from the memory 250 and accordingly pass the authentications made by the designated storage servers. The processing unit 210 produces file-division-and-upload records each storing information indicating the content of each file upload and which storage server in the cloud storage space stores the file upload (step S360). With reference made to FIG. 5, exemplary file-division-and-upload records are described in Table 1:

TABLE 1

| Storage Server | Original File Name | File Upload Name | Content |
|---|---|---|---|
| Google Drive | AAA.docx | AAA_001.jpg | 500a, 500b |
| Dropbox | AAA.docx | AAA_002.jpg | 500a, 500c |
| SugarSync | AAA.docx | AAA_003.jpg | 500b, 500c |

Table 1 describes how the disguised file upload "AAA_001.jpg" is stored in the Google Drive server, which contains two parts of ciphered data 500a and 500b of a word-processing file "AAA.docx", the disguised file upload "AAA_002.jpg" is stored in the Dropbox server, which contains two parts of ciphered data 500a and 500c of the word-processing file "AAA.docx", and the disguised file upload "AAA_003.jpg" is stored in the SugarSync server, which contains two parts of ciphered data 500b and 500c of the word-processing file "AAA.docx". Moreover, with reference made to FIG. 6, exemplary file-division-and-upload records are described in Table 2:

TABLE 2

| Storage Server | Original File Name | File Upload Name | Content |
|---|---|---|---|
| Google Drive | AAA.docx | AAA_001.jpg | 600a, 600c, 610c |
| Dropbox | AAA.docx | AAA_002.jpg | 600b, 610b, 600e |
| SugarSync | AAA.docx | AAA_003.jpg | 610a, 600d, 600f |

Table 2 describes how the disguised file upload "AAA_001.jpg" is stored in the Google Drive server, which contains two parts of ciphered data 600a and 600c of a word-processing file "AAA.docx" and one piece of parity information 610c, the disguised file upload "AAA_002.jpg" is stored in the Dropbox server, which contains two parts of ciphered data 600b and 600e of the word-processing file "AAA.docx" and one piece of parity information 610b, and the disguised file upload "AAA_003.jpg" is stored in the SugarSync server, which contains two parts of ciphered data 600d and 600f of the word-processing file "AAA.docx" and one piece of parity information 610a. Finally, the processing unit 210 stores the file-division-and-upload records for downloading divided files and recovering the original file in the future (step S370). In step S370, the file-division-and-upload records may be enclosed in the manner of a text file or a data table and stored in the storage device 240 or one of the storage servers 110 to 130 via the communications interface 260.

Figure 7:
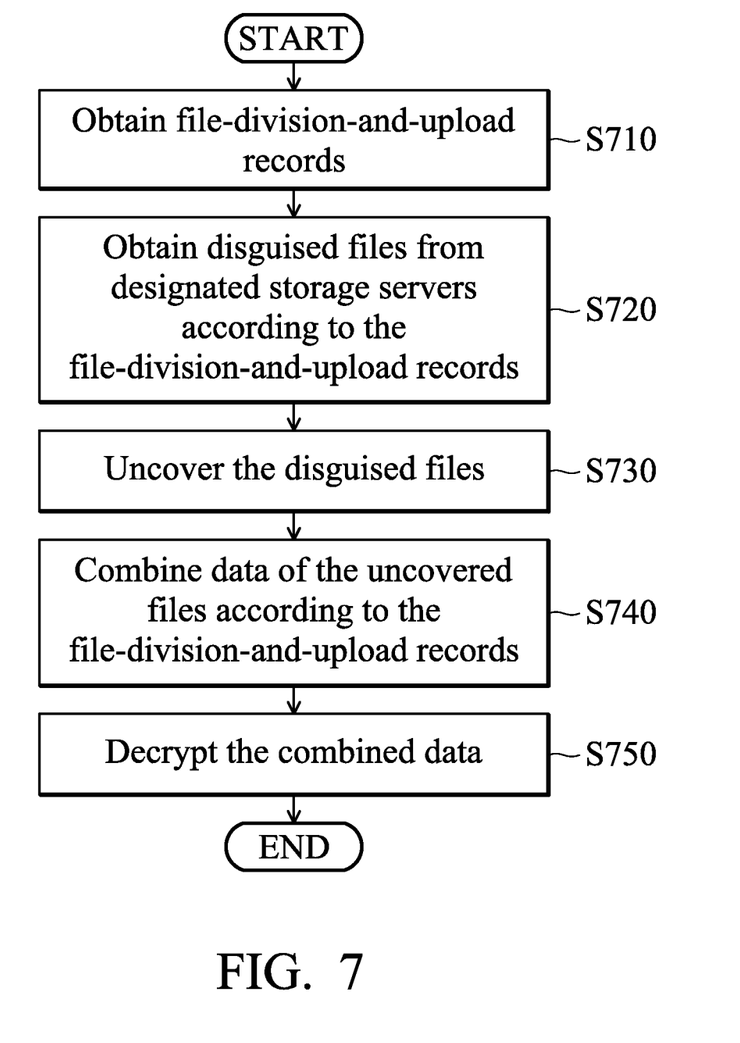
FIG. 7 is a flowchart illustrating a method for downloading data from a storage server of cloud storage space according to an embodiment of the invention.

FIG. 7 is a flowchart illustrating a method for downloading data from a storage server of cloud storage space according to an embodiment of the invention. The method is performed when the processing unit 210 of the desktop computer 150 loads and executes relevant software instructions. The process begins to obtain file-division-and-upload records (step S710). Exemplary file-division-and-upload records may refer to the descriptions of Tables 1 and 2. In step S710, the processing unit 210 may read out the file-division-and-upload records from the storage device 240 or download them from one of the storage servers 110 to 130. The processing unit 210 obtains disguised files from designated storage servers via the communications interface 260 according to the file-division-and-upload records (step S720). The disguised files mentioned in step S720 may refer to the description of the file uploads in steps S340 and S350 of FIG. 3. It should be noted that, before the file downloads, the processing unit 210 needs to obtain the necessary sets of login accounts and passwords from the memory 250 and accordingly passes the authentications made by the designated storage servers. It should be further noted that the processing unit may download all or parts of the disguised files to recover an original file. Taking examples as shown in FIG. 5, the processing unit 210 may download the disguised files from any two of the storage servers 110 to 130. After two disguised files are successfully downloaded, the file download stops to save a file download bandwidth. However, when one disguised file fails to be downloaded, the processing unit 210 downloads the other disguised file from the remaining storage server. Moreover, in FIG. 6, the processing unit 210 may download all disguised files from the storage servers 110 to 130.

The processing unit 210 uncovers the disguised files (step S730). In step S730, the processing unit 210 may extract the actual files from the disguised files using a file split method. For example, the word-processing files "AAA_001.docx", "AAA_002.docx" and "AAA_003.docx" are extracted from disguised image files "AAA_001.jpg", "AAA_002.jpg" and "AAA_003.jpg". In alternative embodiments, when the downloaded files have no cover, the processing unit 210 may omit step S730 to perform the subsequent steps with the downloaded files directly. The processing unit 210 combines data of the uncovered files according to the file-division-and-upload records (step S740). Taking examples as shown in FIG. 5, the processing unit 210 may recover ciphered data by combining the parts 500a and 500b of the file 510 with the part 500c of the file 530 or by combining the part 500a of the file 530 with the parts 500b and 500c of the file 550. Taking examples as shown in FIG. 6, the processing unit 210 may check the integrity of the part 600a of the file 630 and the part 600b of the file 650 by referring to the parity information 610a, the integrity of the part 600c of the file 630 and the part 600d of the file 670 by referring to the parity information 610b, and the integrity of the part 600e of the file 650 and the part 600f of the file 670 by referring to the parity information 610c, and attempt to correct the error bits if required. The processing unit 210 finally decrypts the combined data (step S750). In step S750, the processing unit 210 may perform the decryption by employing DES, AES or other algorithms with a corresponding key. In alternative embodiments, when the combined data is not encrypted, the processing unit 210 may omit step S750 and treat the combined data as the original file.

Although the embodiment has been described as having specific elements in FIG. 2, it is noted that additional elements may be included to achieve better performance without departing from the spirit of the invention. While the process flows described in FIGS. 3 and 7 each include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for accessing data in cloud storage space, executed by a processing unit, comprising:
   obtaining a first file;
   dividing data of the first file into a plurality of parts;
   generating a plurality of file uploads, wherein each file upload comprises at least one of the parts of the data of the first file and parity information; and
   storing each of the file uploads in a different one of a plurality of storage servers of the cloud storage space, wherein the storage servers are governed by different cloud storage providers,
   wherein the parity information for each of the plurality of file uploads is calculated according to at least one of the parts of the data of the first file included in a different one of the file uploads.

2. The method of claim 1, wherein the data of each file upload is encrypted.

3. The method of claim 2, wherein the first file belongs to a first type, and in the step of generating a plurality of file uploads, further comprises:
   storing the parts of the data of the first file in a plurality of second files of a second type to produce each file upload of the second type.

4. The method of claim 1, further comprising:
   producing a plurality of file-division-and-upload records, wherein each file-division-and-upload record stores information indicating the content of each file upload and which storage server of the cloud storage space stores the file upload; and
   storing the file-division-and-upload records.

5. The method of claim 4, wherein the file-division-and-upload records is stored in a storage device.

6. The method of claim 4, wherein the file-division-and-upload records is stored in one of the storage servers.

7. The method of claim 4, further comprising:
   obtaining the file-division-and-upload records;
   obtaining the file uploads from the storage servers according to the file-division-and-upload records; and
   combining the content of the file uploads according to the file-division-and-upload records.

8. The method of claim 7, wherein the data of each file upload is encrypted, the method further comprising:
   decrypting the combined content.

9. The method of claim 8, wherein the first file belongs to a first type, and in the step of generating a plurality of file uploads, further comprises:
   storing the parts of the data of the first file in a plurality of second files of a second type to produce each file upload of the second type,
   the method further comprising:
   after obtaining the file uploads from the storage servers according to the file-division-and-upload records, obtaining the parts of the data of the first file from each file upload of the second type.

10. The method of claim 1, wherein any two of the file uploads comprises redundant content.

11. An apparatus for accessing data in cloud storage space, comprising:
   a communications interface; and
   a processing unit, coupled to the communications interface, obtaining a first file;
   dividing data of the first file into a plurality of parts, generating a plurality of file uploads, wherein each file upload comprises at least one of the parts of the data of the first file and parity information; and storing each of the file uploads in a different one of a plurality of storage servers of the cloud storage space via the communications interface, wherein the storage servers are governed by different cloud storage providers,
   the parity information for each of the plurality of file uploads is calculated according to at least one of the parts of the data of the first file included in a different one of the file uploads.

12. The apparatus of claim 11, wherein the data of each file upload is encrypted.

13. The apparatus of claim 12, wherein the first file belongs to a first type, and the processing unit stores the parts of the data of the first file in a plurality of second files of a second type to produce each file upload of the second type.

14. The apparatus of claim 11, wherein the processing unit produces a plurality of file-division-and-upload records; and stores the file-division-and-upload records, and each file-division-and-upload record stores information indicating the content of each file upload and which storage server of the cloud storage space stores the file upload.

15. The apparatus of claim 14, further comprising:
   a storage device,
   wherein the processing unit stores the file-division-and-upload records in the storage device.

16. The apparatus of claim 14, wherein the processing unit stores the file-division-and-upload records in one of the storage servers via the communications interface.

17. The apparatus of claim 14, wherein the processing unit obtains the file-division-and-upload records; obtains the file uploads from the storage servers according to the file-division-and-upload records via the communications interface; and combines the content of the file uploads according to the file-division-and-upload records.

18. The apparatus of claim 17, wherein the data of each file upload is encrypted, and the processing unit decrypts the combined content.

19. The apparatus of claim 18, wherein the first file belongs to a first type, and the processing unit stores the parts of the data of the first file in a plurality of second files of a second type to produce each file upload of the second type; and after obtaining the file uploads from the storage servers according to the file-division-and-upload records, obtains the parts of the data of the first file from each file upload of the second type.

20. The apparatus of claim 11, wherein any two of the file uploads comprises redundant content.

\* \* \* \* \*